Patented Nov. 13, 1951

2,574,507

UNITED STATES PATENT OFFICE 2,574,507

SETTING AND BINDING MATERIAL AND ITS MANUFACTURE

Herman Weber, Harriman, Tenn.

No Drawing. Application December 17, 1947, Serial No. 792,337

2 Claims. (Cl. 106—109)

This invention relates to an anhydrous setting and binding material which sets after the addition of water thereto, and to its manufacture.

It is an object of this invention to provide from a material containing synthetic anhydrous calcium sulfate a setting and binding composition of matter of such kind and in such a manner that a minimum of treatment and handling of the materials is necessary.

It is another object of the invention to provide a cementitious material capable of setting and forming masses having higher compression strengths than any other cementitious materials containing calcined calcium sulphate, e. g. plaster of Paris, excepting certain highly specialized and expensive materials.

Other objects and advantages and uses of the process and product according to this invention will become apparent from the following specifications thereof.

As a starting material I use the residues of the process of manufacturing hydrofluoric acid from fluorspar. These residues are valueless and bothersome, and considerable expense has been entailed by the industry in disposing of them. Said residues as they occur in this process are an anhydrous calcium sulphate, containing, according to the starting material (fluorspar), certain impurities.

The principal embodiment of my invention is the conversion of the otherwise non-setting and non-binding synthetic anhydrous calcium sulphate residue into a hard non-hydrating setting and binding material. This conversion process consists of mixing the neutral residue, after being reduced to passing an 80 mesh sieve, with about 3% slaked lime.

I have found that this small amount of slaked lime added to the residue releases sufficient calcium hydroxide to cause a rapid dissolving and supersaturation of the calcium sulphate when mixed with water, which then, with the evaporation of the water, results in a vigorous recrystallization of the anhydrous calcium sulphate, the only cause of the setting and binding. It is here emphasized that the setting process does not occur through hydration of the calcium sulphate, and the set mass remains an anhydrous calcium sulphate. The water content has been found to be but 3% plus after setting and drying, compared to the water content found to be up to seven times this amount in all products containing calcium sulphate in hydrated form.

In support of my statement that the setting of my material is not due to hydration of the calcium sulphate, the following test results are given:

By weight... 220 parts neutralized residue plus 5% slaked lime.
plus......... 55 parts water.

equals...... 275 parts fresh mix.
By weight... 227 parts after setting and drying.

difference.... 48 parts water evaporated.

Therefore only seven (7) parts water (3.1%) remains in the set and dried mass.

The compression resistance and tensile strength of the set mass is influenced by the amount of water used in the mixing. It has been found that a water factor of 18% (earth moist) gives the highest test results; such tests showing a compression resistance above 4000 lbs. p. s. i., tensile strength above 300 lbs. p. s. i. and hardness 3 after 7 days. Strength values obtained when mixed for conventional uses with mortar sand, expanded vermiculite, haydite, and perlite (up to 1:3 by weight) were found to be superior to those obtained with the common commercial plasters. When used for purposes requiring maximum strength and hardness the water factor should be held to 18–25%; e. g. prefabricated building blocks, stones, plates, floor tiles, and surfaces exposed to abrasive wear. When used for non-weight-bearing purposes, or when hardness is less important, water is used in the amount needed to achieve the required workability; e. g. base and finish coat plasters, mortars, and similar uses. Setting time of the material is from less than one hour to eight hours, according to the amount of water (18% $H_2O$—1 hr., 37% $H_2O$—8 hrs.) and/or aggregates used.

In addition to the aggregates mentioned above, special properties can be conferred by use of other modifying agents such as mineral pigments, light ashes, organic fillers and fibers.

Among other outstanding characteristics of this material, in addition to the high compression resistance, tensile strength and hardness, is its stability towards oils and acids and other chemicals which makes it useful for industrial floors, laboratory table tops, etc.; its dimensional stability upon setting in contrast to plasters which set with hydration is outstanding, along with its stability at high temperatures due to the absence of crystalline water of hydration which characterizes hydrated plasters; its wet strength (4000 lbs. p. s. i. after six months' submersion), and absence of deleterious effects of freezing and thawing.

From the above description, it is obvious that various modifications may be made in the use of the new product without departing from the spirit of the invention. All the additions may be modified within the scope of the following claims.

I claim:

1. A new anhydrous quick-setting material, comprising finely-ground artificial anhydrite resulting from the process of producing fluorine by the decomposition of fluorspar with concentrated sulfuric acid and about 3 per cent of slaked lime.

2. The process of manufacturing an anhydrous setting and binding material, which comprises adding an amount of about 3 per cent by weight of slaked lime to finely ground (passing 80 mesh) neutral or neutralized residues resulting from the process of producing fluorine by the decomposition of fluorspar with concentrated sulfuric acid, said residues consisting mainly of anhydrite and small amounts of impurities resulting from the process of producing fluorine, especially sulfuric and hydrofluoric acid.

HERMAN WEBER.

REFERENCES CITED

The following references are of record in the file of this patent:

UNITED STATES PATENTS

| Number | Name | Date |
|---|---|---|
| 1,972,527 | Lefebure | Sept. 4, 1934 |

FOREIGN PATENTS

| Number | Country | Date |
|---|---|---|
| 524,147 | France | 1921 |
| 401,190 | Germany | 1924 |
| 706,007 | Germany | 1941 |